(12) United States Patent
Schulist et al.

(10) Patent No.: US 7,706,824 B2
(45) Date of Patent: Apr. 27, 2010

(54) REQUESTING AND CONTROLLING ACCESS IN A WIRELESS COMMUNICATIONS NETWORK

(75) Inventors: Matthias Schulist, Erlangen (DE); Georg Frank, Nuremberg (DE); Hans Schotten, Nuremberg (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1174 days.

(21) Appl. No.: 10/526,520

(22) PCT Filed: Sep. 27, 2002

(86) PCT No.: PCT/EP02/10887

§ 371 (c)(1),
(2), (4) Date: Mar. 3, 2005

(87) PCT Pub. No.: WO2004/030392

PCT Pub. Date: Apr. 8, 2004

(65) Prior Publication Data

US 2006/0018289 A1    Jan. 26, 2006

(51) Int. Cl.
*H04B 7/00* (2006.01)

(52) U.S. Cl. .............. 455/517; 455/11.1; 455/90.1; 455/90.2; 455/90.3; 455/403

(58) Field of Classification Search ............... 370/335; 455/517
See application file for complete search history.

(56) References Cited

U.S. PATENT DOCUMENTS

| | | | | |
|---|---|---|---|---|
| 4,611,320 | A * | 9/1986 | Southard | 370/241 |
| 5,751,702 | A * | 5/1998 | Evans et al. | 370/314 |
| 6,236,365 | B1 * | 5/2001 | LeBlanc et al. | 342/457 |
| 6,256,301 | B1 * | 7/2001 | Tiedemann et al. | 370/342 |
| 6,259,724 | B1 * | 7/2001 | Esmailzadeh | 375/143 |
| 6,266,013 | B1 * | 7/2001 | Stilp et al. | 342/387 |
| 6,353,604 | B2 * | 3/2002 | Grimwood et al. | 370/335 |
| 6,480,525 | B1 * | 11/2002 | Parsa et al. | 375/141 |
| 6,507,601 | B2 * | 1/2003 | Parsa et al. | 375/141 |
| 6,539,233 | B1 * | 3/2003 | Taketsugu | 455/522 |
| 6,545,994 | B2 * | 4/2003 | Nelson et al. | 370/337 |

(Continued)

FOREIGN PATENT DOCUMENTS

WO    WO 9960729 A    11/1999

OTHER PUBLICATIONS

European Patent Office, International Search Report for PCT/EP02/10887, dated Jun. 11, 2003.

*Primary Examiner*—Duc Nguyen
*Assistant Examiner*—Hai V Nguyen
(74) *Attorney, Agent, or Firm*—Roger S. Burleigh (57) ABSTRACT

A method, a computer program product and a device for requesting access to a node (BS) of a wireless communications network (10) are described. In the network (10) identification codes are used to differentiate access requests of different network components (UE). The method comprises the step of determining information about a transmission path (12) to e.g. the network node (BS), the step of determining an identification code in dependence on the determined transmission path information, wherein previously an association between identification codes and transmission path information has been established, and the step of modulating the selected identification code onto a signal to generate an access request signal carrying transmission path information.

14 Claims, 8 Drawing Sheets

U.S. PATENT DOCUMENTS

| | | | |
|---|---|---|---|
| 6,549,525 B2 * | 4/2003 | Odenwalder | 370/332 |
| 6,587,447 B1 * | 7/2003 | Wang et al. | 370/335 |
| 6,587,672 B1 * | 7/2003 | Chuah et al. | 455/69 |
| 6,594,248 B1 * | 7/2003 | Karna et al. | 370/342 |
| 6,606,313 B1 * | 8/2003 | Dahlman et al. | 370/347 |
| 6,611,514 B1 * | 8/2003 | Moulsley | 370/348 |
| 6,625,138 B2 * | 9/2003 | Karna et al. | 370/342 |
| 6,643,275 B1 * | 11/2003 | Gustafsson et al. | 370/328 |
| 6,643,318 B1 * | 11/2003 | Parsa et al. | 375/141 |
| 6,650,629 B1 * | 11/2003 | Takahashi et al. | 370/335 |
| 6,678,529 B1 * | 1/2004 | Moulsley et al. | 455/522 |
| 6,704,328 B1 * | 3/2004 | Khaleghi et al. | 370/468 |
| 6,735,442 B2 * | 5/2004 | Tu et al. | 455/434 |
| 6,757,293 B1 * | 6/2004 | Chuah et al. | 370/432 |
| 6,859,445 B1 * | 2/2005 | Moon et al. | 370/335 |
| 6,859,463 B1 * | 2/2005 | Mayor et al. | 370/445 |
| 6,882,851 B2 * | 4/2005 | Sugar et al. | 455/454 |
| 6,928,287 B2 * | 8/2005 | Trott et al. | 455/447 |
| 6,937,641 B2 * | 8/2005 | Li et al. | 375/141 |
| 6,940,242 B1 * | 9/2005 | Maslov et al. | 318/400.2 |
| 6,985,474 B2 * | 1/2006 | Dahlman et al. | 370/347 |
| 6,992,998 B1 * | 1/2006 | Bhatoolaul et al. | 370/329 |
| 7,013,146 B2 * | 3/2006 | Wang et al. | 455/455 |
| 7,046,717 B2 * | 5/2006 | Kanterakis et al. | 375/141 |
| 7,050,824 B2 * | 5/2006 | Masseroni et al. | 455/522 |
| 7,058,038 B2 * | 6/2006 | Yi et al. | 370/335 |
| 7,075,971 B2 * | 7/2006 | Parsa et al. | 375/141 |
| 7,076,262 B1 * | 7/2006 | Bhatoolaul et al. | 455/522 |
| 7,079,523 B2 * | 7/2006 | Nelson et al. | 370/342 |
| 7,103,027 B2 * | 9/2006 | Dick et al. | 370/335 |
| 7,110,785 B1 * | 9/2006 | Paranchych et al. | 370/333 |
| 7,143,330 B2 * | 11/2006 | Ahn et al. | 714/748 |
| 7,158,493 B1 * | 1/2007 | Uhlik et al. | 370/329 |
| 7,164,726 B1 * | 1/2007 | Trott | 375/267 |
| 7,164,739 B1 * | 1/2007 | Trott | 375/347 |
| 7,164,918 B2 * | 1/2007 | Moulsley et al. | 455/450 |
| 7,174,183 B2 * | 2/2007 | Moulsley et al. | 455/522 |
| 7,177,660 B2 * | 2/2007 | Mousley et al. | 455/522 |
| 7,209,515 B2 * | 4/2007 | Kilfoyle et al. | 375/152 |
| 7,209,709 B2 * | 4/2007 | Miyazaki et al. | 455/67.11 |
| 7,254,413 B2 * | 8/2007 | Muller et al. | 455/522 |
| 7,302,276 B2 * | 11/2007 | Bernhardsson et al. | 455/522 |
| 7,324,465 B2 * | 1/2008 | Lim et al. | 370/278 |
| 7,324,785 B2 * | 1/2008 | Hansen et al. | 455/69 |
| 7,352,825 B2 * | 4/2008 | Das et al. | 375/316 |
| 7,359,427 B2 * | 4/2008 | Kanterakis et al. | 375/141 |
| 7,383,472 B2 * | 6/2008 | Miura | 714/42 |
| 7,453,857 B2 * | 11/2008 | Mangold et al. | 370/338 |
| 7,484,111 B2 * | 1/2009 | Fung | 713/320 |
| 7,567,791 B2 * | 7/2009 | Laroia et al. | 455/343.2 |
| 2001/0026543 A1 * | 10/2001 | Hwang et al. | 370/335 |
| 2001/0033579 A1 * | 10/2001 | Nelson et al. | 370/447 |
| 2001/0038619 A1 | 11/2001 | Baker et al. | |
| 2002/0089957 A1 * | 7/2002 | Viero | 370/336 |
| 2002/0114297 A1 * | 8/2002 | Karna et al. | 370/335 |
| 2003/0026324 A1 * | 2/2003 | Li et al. | 375/141 |
| 2003/0058811 A1 * | 3/2003 | Shurvinton | 370/321 |
| 2003/0060224 A1 * | 3/2003 | Nelson et al. | 455/522 |
| 2003/1004880 * | 3/2003 | Kilfoyle et al. | 370/441 |
| 2003/0100328 A1 * | 5/2003 | Klein et al. | 455/522 |
| 2003/0142686 A1 * | 7/2003 | Kim | 370/418 |
| 2003/0161386 A1 * | 8/2003 | Schilling | 375/141 |
| 2003/0231702 A1 * | 12/2003 | Oates et al. | 375/148 |
| 2004/0001429 A1 * | 1/2004 | Ma et al. | 370/210 |
| 2004/0008658 A1 * | 1/2004 | Dahlman et al. | 370/342 |
| 2004/0009785 A1 * | 1/2004 | Nelson et al. | 455/522 |
| 2004/0059825 A1 * | 3/2004 | Edwards et al. | 709/230 |
| 2004/0081115 A1 * | 4/2004 | Parsa et al. | 370/320 |
| 2004/0132454 A1 * | 7/2004 | Trott et al. | 455/447 |
| 2004/0252655 A1 * | 12/2004 | Lim et al. | 370/321 |
| 2005/0254467 A1 * | 11/2005 | Li et al. | 370/335 |
| 2007/0173277 A1 * | 7/2007 | Yun | 455/522 |

\* cited by examiner

REQUESTING AND CONTROLLING ACCESS IN A WIRELESS COMMUNICATIONS NETWORK

FIELD OF THE INVENTION

The invention relates to the field of requesting and controlling access to a node of a wireless communications network. In particular, the invention relates to access schemes which employ identification codes to differentiate between access requests of different network components.

BACKGROUND OF THE INVENTION

Modern wireless communications networks employ different access techniques when a first network component intends to access a second network component. As an example for such access techniques the so-called random access (RA) scheme can be mentioned. The name "random access" indicates that access requests are generated in a random manner from the point of view of a network component receiving the access requests.

An exemplary RA scheme is specified by the $3^{rd}$ Generation Partnership Project (3GPP) in section 6 of the 3GPP document TS 25.214, Version 4.4.0 (2002-03) titled "Technical Specification Group Radio Access Network; Physical Layer Procedures (FDD); Release 4". Another exemplary RA scheme has been defined by standardization bodies for the Global System of Mobile Communications (GSM).

In RA schemes there may arise the situation that several network components simultaneously try to access a specific further network component, i.e. that access requests of different network components "collide". Such collisions are detrimental to the quality of service since they result in access delays, message losses, etc. Consequently, various techniques have been introduced to avoid or reduce the detrimental effects of collisions inherent in RA schemes.

For example it has been proposed to implement slotted repetition schemes according to which a specific network component repeatedly transmits its access request until it receives an acknowledgement from another network component. Furthermore, collisions may be avoided or reduced by providing a technique that allows to differentiate between access requests of different network components. To that end each access request may comprise a particular identification code, also called "random discriminator" (GSM) or "signature" (3GPP), which allows a network component that receives two or more access requests simultaneously to discriminate between random access requests of different network components. A third way of reducing collisions inherent in RA schemes is to group the network components into specific access classes. The definition of such access classes allows to prohibit whole populations of network components the transmission of access requests based on their membership to a specific access class.

All these mechanisms help to avoid or reduce access delays and other detrimental effects of colliding access requests typical for RA schemes. However, such collisions are not the only source of e.g. access delays. Another source are for example too low power levels of the access request signals. Too high power levels, however, unnecessarily increase the overall interference level and reduce the system capacity.

This demonstrates the need for efficient power control mechanisms. In general, power control refers to the possibility to control within a specific range the transmit power of individual network components. An exemplary power control mechanism for the transmission of access request signals within RA schemes is described in Matthias Schulist, Georg Frank, "Link Level Performance Results for a WCDMA Random Access Scheme with Preamble Power Ramping and Fast Acquisition Indication", Proc. of VTC'99.-Fall. According to this power control mechanism a specific network component repeatedly transmits its access request signal using a power ramping technique. Starting at a properly chosen initial power level, successive access request signals are transmitted at increasing power levels until they are detected by a network component which has the task of access management.

In response to receipt of an access request signal the network component having the task of access management has to signal to the network component which issued the request whether the request is granted or denied. To this end an access control signal has to be generated and transmitted.

To choose an appropriate transmit power level for the access control signal is an operator's choice which influences the capacity of the network component that transmits the access control signal. In order to ensure a sufficiently high detection probability of the access control signal, the access control signal will usually be sent at a comparatively high transmit power level.

There is a need for an effective signaling mechanism between a network component requesting access to a node of a wireless communications network and another network component controlling the access.

SUMMARY OF THE INVENTION

This need is satisfied according to the invention by a method of requesting access to a node of a wireless communications network in which identification codes are used to differentiate access requests of different network components, the method comprising the step of determining information about a transmission path within the network, the step of determining an identification code in dependence on the determined transmission path information, wherein previously an association between identification codes and transmission path information has been established, and the step of modulating the determined identification code onto a signal to generate an access request signal carrying transmission path information.

A complementary aspect of the invention relates to a method of controlling access to a node of a wireless communications network in which identification codes are used to differentiate access requests of different network components, the method comprising the step of receiving an access request signal onto which an identification code has been modulated, analyzing the identification code to derive a transmit power level therefrom, wherein previously a (direct or indirect) association between identification codes and transmit power levels has been established, and the step of transmitting an access control signal including access control information at the transmit power level previously derived.

By associating identification codes with transmission path information a signaling mechanism is realized which allows an improved signaling between a network component requesting and a network component controlling access to a network node. Preferably, the network component controlling the access is identical with the network node to which access is requested. The invention may be practiced in any wireless communications network which uses identification codes for managing access requests and in particular in context with RA or RA-like schemes using identification codes like "random discriminators" (GSM) or "signatures" (3GPP).

The transmission path information may relate to various aspects directly or indirectly related to a transmission path between e.g. the requesting network component and the controlling network component or the network node. It may relate for example to a path loss parameter or any other parameter characteristic of a state or length of the transmission path stretching between the network component which requests access and e.g. the network node to which access is requested. The transmission path information carried by the access request signal may be indicative of a transmit power level e.g. required to guarantee a sufficiently high detection probability of a signal like an access control signal transmitted after receipt of and/or in response to the access request signal.

The transmission path information is sent with the access request signal to the network component controlling the access to the network node and can be exploited by this network component for various purposes. Preferably, the transmission path information is exploited for selecting an appropriate transmit power level for at least one of the access control signal and subsequent signals. Alternatively or additionally, the transmission path information may be passed to other network components for e.g. power control purposes. However, the transmission path information may also be used for purposes that do not or not directly relate to power control. As an example the generation of transmission path statistics can be mentioned.

The transmission path information may be determined in various ways depending on its content. For example the transmission path information may be obtained by means of measurements, calculations or estimation steps.

Once the transmission path information has been determined, the corresponding identification code is determined next. Depending on the determined transmission path information, the identification code may for example be selected out of a predefined set or range of identification codes. To that end a look up table may be provided which associates identification codes and transmission path information. Such an association may, however, also be established by means of specific functions which allow a mapping of transmission path information on identification codes (and vice versa). Preferably, specific classes of transmission path information relating for example to individual ranges of transmission path parameters are defined and the identification codes are grouped or arranged such that an association between the classes of transmission path information and groups or ranges of identification codes or individual identification codes is obtained.

The identification codes preferably have the form of orthogonal sequences. This allows the simultaneous or quasi-simultaneous transmission of the identification codes to (and from) the network component which controls access.

In the following, different aspects of the invention will be described separately for the network component which requests access on the one hand and the network component which controls access on the other hand.

Aspects in context with the network component which requests access will be described first. This network component is preferably configured to receive in response to its access request signal an access control signal including access control information and to analyze this access control signal at least with respect to the included access information. The access control information relates for example to explicitly granting or denying an access request or to the specification of a "retry-after" interval.

In RA schemes a plurality of network components might simultaneously attempt to access a single network node. In such a case the access control signal may simultaneously include access control information for this plurality of network components. Preferably, the access control information for a particular network component is associated in the access control signal with the network component's identification code as stated in the network component's access request signal. Thus, each network component may fetch from the access control signal the access control information relating to its own access request.

To increase the detection probability of an access control signal and to reduce the false alarm probability, a received access control signal may be subjected to an interference canceling step. Various interference canceling routines may be used. According to a preferred variant of the invention, the interference canceling step includes subtracting from the access control signal a compensation signal reflecting access control information that is not associated with the identification code used by the network component which performs the interference canceling step. Advantageously, the compensation signal relates only to such access control information which was sent at the same and/or a higher power level than the network component's own access control information. The network component may derive information about the power level with which specific access control information was sent by analyzing the identification code associated with this access control information.

In order to obtain a satisfying trade off between power efficiency and access delay, the access request signal transmitted by a network component requesting access to a network node may be transmitted repeatedly using transmit power ramping. During transmit power ramping the transmit power of repeatedly transmitted access request signals is increased according to a particular power ramping scheme.

In the following, aspects in conjunction with the network component receiving one or more access request signals will be described in more detail. A possible variant of the method performed according to the invention by such a network component may comprise the step of receiving an access request signal onto which an identification code has been modulated, the step of analyzing the identification code with respect to transmission path information associated therewith, wherein previously an association between identification codes and transmission path information has been established, the step of deriving a transmit power level from the previously obtained transmission path information, and the step of transmitting an access control signal including access control information at the previously derived transmit power level.

The transmit power level may be directly derived from the identification code, for example using a look up table, or may indirectly be derived from transmission path information deduced from the identification code included in the access request signal.

As has been mentioned above, the access control signal transmitted by the access controlling network component in response to detection of an access request signal includes access control information. Preferably, the access control signal additionally includes the identification code derived from the detected access request signal. In the access control signal the identification code of a particular network component requesting access may be associated with the corresponding access control information for this network component. This is especially advantageous in the case the access control signal simultaneously includes access control information for a plurality of network components. The reason for this is the fact that each network component may have stored the identification code it previously modulated onto the access request signal so that each network component can fetch the right access control information out of the access control signal.

If the access control signal includes access control information for a plurality of network components, the transmit power level of the access control signal may be derived and adjusted individually for each access control information to be sent. This means for example that the access control signal may be transmitted at a higher transmit power level when control information intended for a remote network component is sent and vice versa.

The invention can be implemented as a hardware solution and as a computer program product comprising program code portions for performing the above steps when the computer program product is run on a network component. The computer program product may be stored on a computer readable recording medium like a data carrier attached to or removable from the network component.

The hardware solution includes a network component configured to request access to a node of a wireless communications network and comprising a first determination unit for determining information about a transmission path within the network, a database including data associating identification codes and transmission path information, and a second determination unit for determining in dependence on the determined transmission path information an identification code to be included in an access request signal carrying transmission path information. Additionally, this network component may comprise a modulator for modulating the selected identification code onto a signal to generate the access request signal and a transmitter for transmitting the access request signal.

According to a complementary aspect of the invention, a network component configured to control access to a node of a wireless communications system is provided, the network component comprising a database including data associating identification codes and transmit power information, an analyzer for analyzing the identification code included within a received access request signal with respect to the transmit power information associated with the identification code, and a derivation unit for deriving from the transmit power information obtained by the analyzer a transmit power level for an access control signal.

The database which is used for associating identification codes and transmit power information may have various configurations. It may for example be configured as a look up table directly correlating individual identification codes or ranges of identification codes with corresponding transmit power levels. On the other hand, it is also possible that the database indirectly associates identification codes and transmit power information via transmission path information. In such a case the identification codes may for example be associated with transmission path information and the transmission path information may be correlated with transmit power levels. The transmit power level to be used for transmitting an access control signal can thus be derived from transmission path information correlated with a specific identification code.

The network component fulfilling the task of access control may further comprise a receiver for receiving the access request signal onto which the identification code has been modulated and a transmitter for transmitting the access control signal at the transmit power level derived by the derivation unit.

BRIEF DESCRIPTION OF THE DRAWINGS

Further aspects of the invention will become apparent from the following description of various embodiments of the invention and upon reference to the drawings, in which.

DESCRIPTION OF PREFERRED EMBODIMENTS

In the following the invention will exemplarily be set forth with respect to a wireless communications system according to the 3GPP specification. In particular, the invention will be described in context with the RA scheme defined in section 6 of the 3GPP document TS 25.214, Version 4.4.0 (2002-03) titled "Technical Specification Group Radio Access Network; Physical Layer Procedures (FDD); Release 4". It should be noted, however, that the invention could also be practiced in another wireless communications system like CDMA 2000.

Furthermore, although the invention is hereinafter described in context with network components in the form of user equipments (UEs) requesting access to a common network node (network component) configured as a base station (BS), the invention is neither limited to such specific network components nor does the network node to which access is requested necessarily have to be identical with the network component controlling access to this network node.

In particular, the invention is not limited to the "remote power control" functionality described hereinafter. Other functionalities apart from power control could be implemented on the basis of the inventive concept as well.

Figure 1:
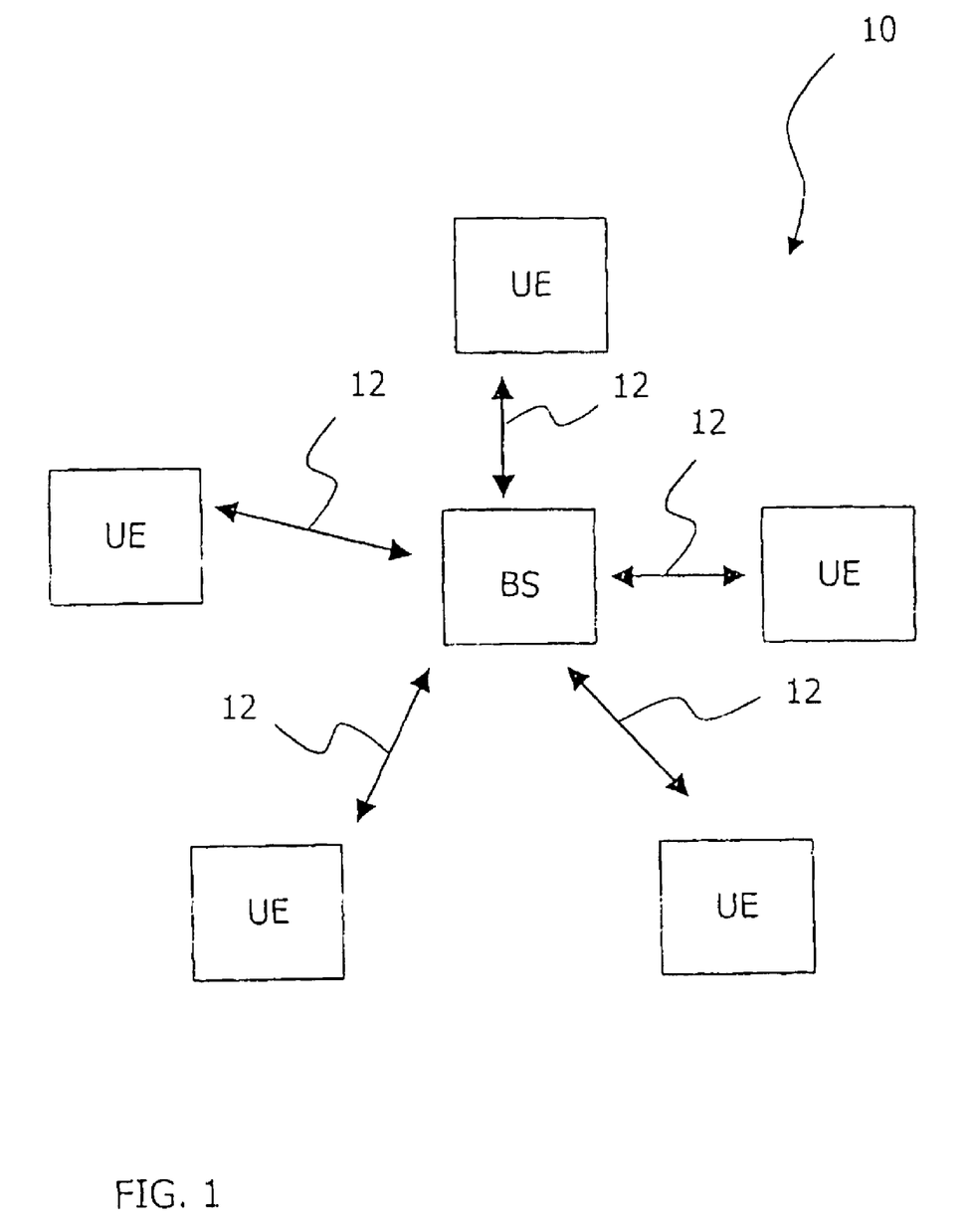
FIG. 1 schematically shows the topography of a wireless communications network according to the invention.

In FIG. 1 an exemplary 3GPP wireless communications network 10 according to the invention is depicted. As becomes apparent from FIG. 1, the network 10 comprises a central network node in the form of a base station BS and a plurality of user equipments UEs in the form of e.g. mobile telephones, personal digital assistants (PDAs), etc. Communication between the base station BS and the individual user equipments UEs is performed over individual transmission paths 12. In FIG. 1 between the base station BS and each user equipment UE only a single transmission path 12 is shown. It should be kept in mind, however, that in reality multipath propagation may occur.

3GPP has defined an RA scheme for its FDD (WCDMA) mode in the 3GPP specifications TSG-RAN WG1 TS25.211 to TS 25.215. The 3GPP RA scheme provides benefits from both an access delay and a power efficiency point of view. The RA scheme comprises a reverse link (uplink, UL) component that stretches from the user equipment UE towards the base station BS and a forward link (downlink, DL) component that stretches from the base station BS to the user equipment UE.

The UL component is called Physical Random Access CHannel (PRACH) and the DL component is called Acquisition Indicator CHannel (AICH). In general, the UL PRACH is used for transmitting access request signals and messages to the base station, while the DL AICH is used to transmit to the user equipment UE access control information generated in response to detection of an access request.

Figure 2:
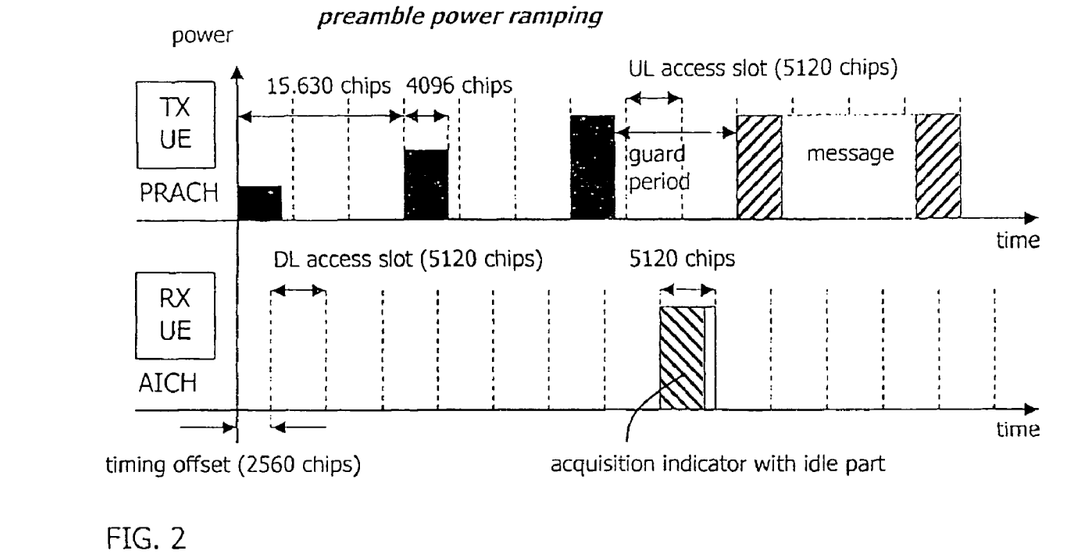
FIG. 2 schematically shows a random access scheme in which the present invention may be implemented.

FIG. 2 shows a sketch of the 3GPP WCDMA RA scheme. In the following, this RA scheme will briefly be described as far as it is relevant for the present invention.

In the upper half of FIG. 2 the UL PRACH is depicted. The UL PRACH is divided into a plurality of individual access slots having a length of 5120 chips each. At a chip rate of 3.84 Mchips/s this corresponds to an access slot length of 1.33 ms. Each time a user wishes to e.g. set up a call, his user equipment UE randomly selects one UL access slot out of a predefined set of access slots (slotted ALOHA concept).

Each access on the PRACH is divided into two distinct phases which are separated by an acquisition indication phase on the AICH. During the first phase an access request signal in the form of a preamble is repeatedly sent on the PRACH. During the second phase, which is initiated in response to receipt of a positive preamble acknowledgement on the AICH, a message is sent on the PRACH. Thus, the UL PRACH frame format consists of one or several preambles, each preamble having a length of 4096 chips ($\approx$1 ms) and being followed by a guard period of a flexible length and a message part of 10 or 20 ms. Preamble and guard period timing are matched to the RA access slot structure to allow an exact UL time frame alignment of the message part.

As can be seen from FIG. 2, the access request signal (preamble) repeatedly transmitted by the user equipment UE on the UL PRACH is subjected to power ramping. During the preamble power ramping phase, the preamble power level on the UL PRACH is steadily increased by the user equipment UE starting at a properly chosen initial power level. The initial power level may for example be determined by estimating the path loss taking known base station transmit power and interference levels into account.

Figure 3:
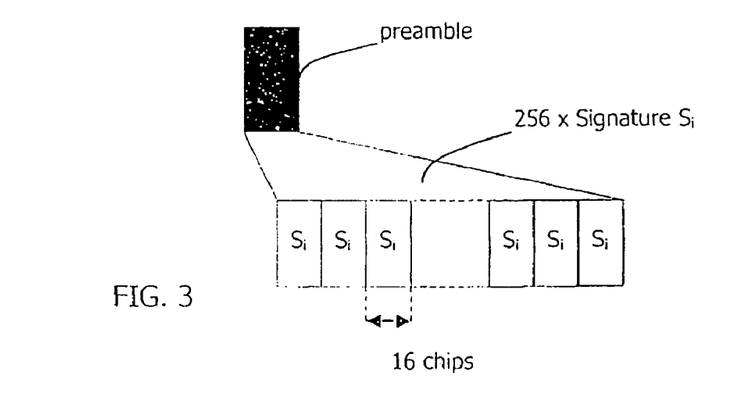
FIG. 3 schematically shows the structure of an access request having the form of a preamble signal.

The structure of the preamble, i.e. of the access request signal, is depicted in FIG. 3. As can be gathered from FIG. 3, the preamble is a sequence of 256 repetitions of a signature Si of length 16 chips.

The preamble signatures are used as identification codes to avoid or reduce the collision probability of preambles (access requests) originating from different network components. To that end 3GPP specifies sixteen signatures in the form of orthogonal sequences (Walsh sequences) that according to the 3GPP specification are randomly selected by the user equipment UE during each access attempt.

A user equipment UE requesting access repeatedly transmits randomly selected preambles at an increasing power level until the latest preamble is detected at the base station BS. Having identified the preamble signature, the base station BS transmits an immediate ("fast") acquisition indicator (AI) on the DL AICH as illustrated in the lower half of FIG. 2. As becomes apparent from FIG. 2, there is a timing offset between the UL PRACH and the DL AICH access slots.

Figure 4:
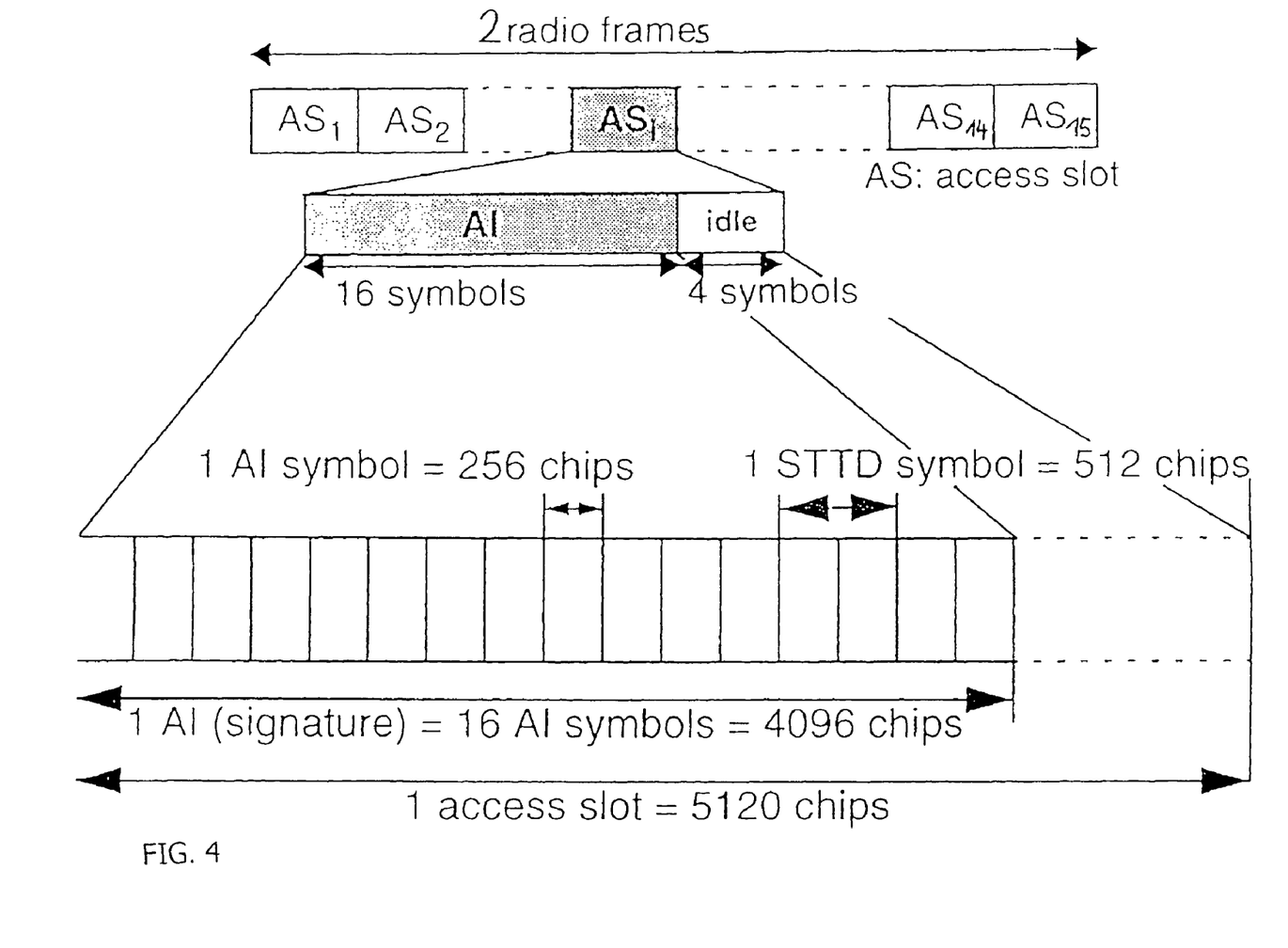
FIG. 4 schematically shows the structure of an acquisition indicator serving as access control information.

According to the DL AICH frame format depicted in FIG. 2 and FIG. 4, a radio frame is divided into access slots having a duration of 5120 chips each. Thus, the DL AICH access slot structure exactly corresponds to the UL PRACH slot structure. Each access slot on the DL AICH consists of an AI part having a length of 4096 chips followed by an idle time of length 1024 chips (see FIG. 4). The AI part of each access slot consists of the symbol-wise combination of sixteen complex orthogonal code words $a_1 \ldots a_{16}$, each code word having a duration of 4096 chips after spreading. The code words $a_1 \ldots a_{16}$ match one to one the preamble signatures used on the UL PRACH. Any successfully received preamble on the UL PRACH carrying a specific signature is assigned the corresponding AI code word on the DL AICH. Therefore, the code words are also called AI signatures. This allows a requesting user equipment UE being aware of its preamble signature to fetch the correct AI on the DL AICH. Referring to FIG. 4, each AI signature consists of sixteen AI symbols.

An AI constitutes an access control signal and carries information relating to the following contents:

AI=1: positive preamble acknowledgement: preamble detected, user equipment UE should send message;

AI=0: preamble not detected: re-send preamble at an increased power level;

AI=−1: negative preamble acknowledgement: preamble detected, user equipment UE should not send message.

The case A=0 thus essentially means that the respective AI signature is not transmitted at all.

Figure 5:
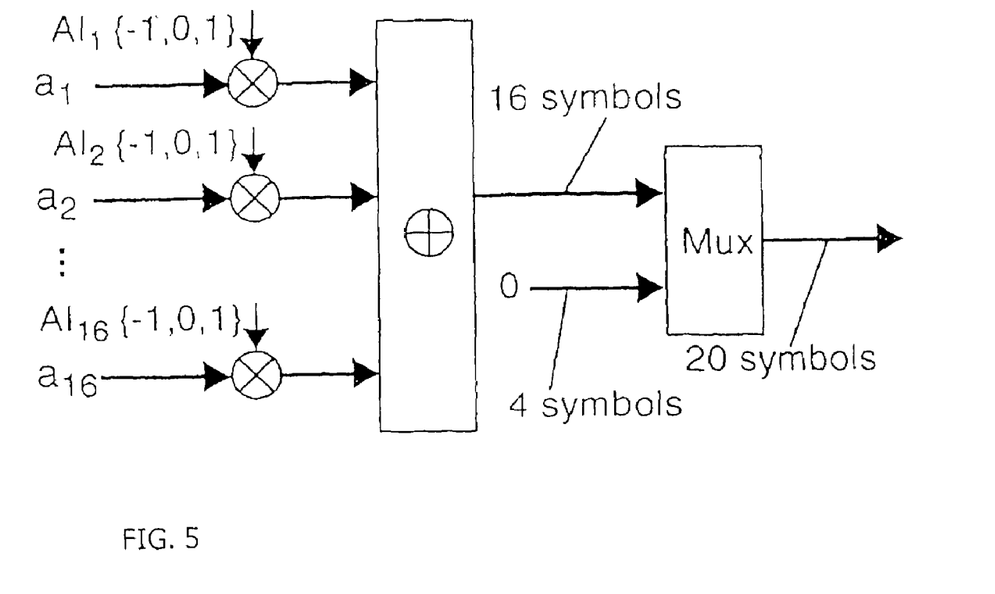
FIG. 5 schematically shows the generation of access control information.

The generation of AICH information per access slot is schematically shown in FIG. 5. As becomes apparent from FIG. 5, during one access slot access control information for up to sixteen access requesting user equipments UEs can be transmitted on the DL AICH. This is due to the fact that the sixteen code words $a_1 \ldots a_{16}$ are orthogonal with respect to each other.

A user equipment UE monitors during the guard period following the transmission of a preamble on UL PRACH whether or not an AI including an AI signature corresponding to the signature modulated onto the preamble is detected on DL AICH. If this is the case, the dedicated access control information included in the AI is assessed. In the case of a positive acknowledgement (AI=1), the message is sent by the user equipment UE at the next UL PRACH access slot after AI transmission and reception. In the case of a negative acknowledgement (AI=−1), the user equipment UE refrains from sending the message and aborts preamble power ramping. In the case the respective AI signature is not detected (AI=0), the user equipment UE continues with preamble power ramping.

Figure 6:
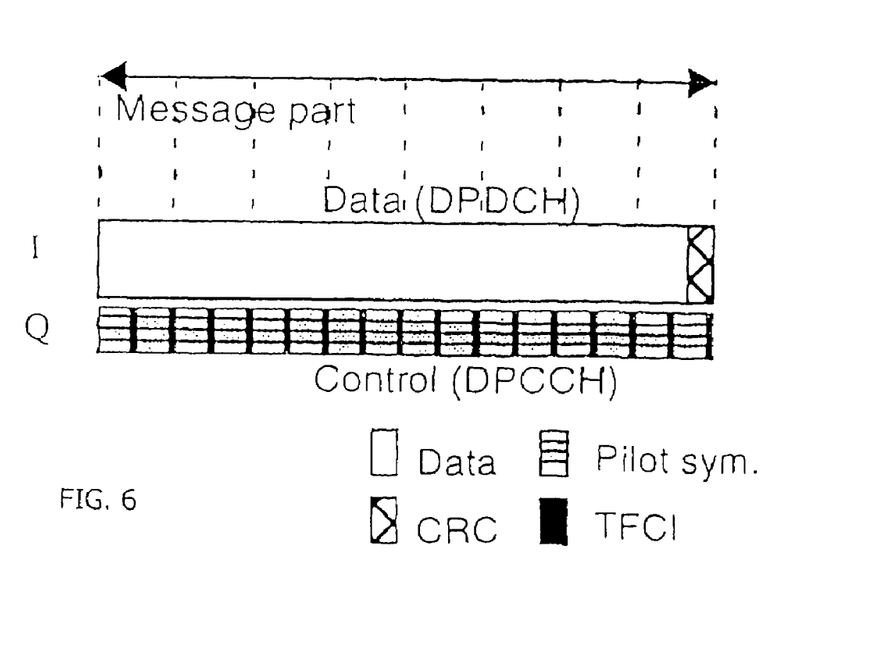
FIG. 6 schematically shows the structure of a message sent in response to a positive access control information.

The format of a message sent on UL PRACH in the case of AI=1 is schematically depicted in FIG. 6. The message part occupies one or two radio frame(s). Data is transmitted in the "I" branch, referred as to as Dedicated Physical Data CHannel (DPDCH). Pilot symbols and control information like Transport Format Combination Indicators (TFCIs) are transmitted in the "Q" branch, called the Dedicated Physical Control CHannel (DPCCH). The data transmission on DPDCH is concluded with the transmission of a Cyclic Redundancy Code (CRC). As becomes apparent from FIG. 2, the message may be sent at the same transmit power level as the last preamble signal, i.e. as the preamble signal that gave rise to the AI on the DL AICH, or at a transmit power level having a power offset with respect to the transmit power level of the last preamble signal.

In order to avoid access delays and excessively high preamble and message power levels, secure detection of an AI that was sent by the base station BS on the DL AICH to the user equipment UE has to be ensured in different transmission propagation scenarios. This is reflected by the so-called detection probability that should ideally approach 100%. In addition, and in particular to avoid high access delays and increased interference levels in the base station BS, AIs that were actually not transmitted by the base station BS should not give rise to corresponding detection results by any user equipment UE. This is reflected by the so-called false alarm or imitation probability that should ideally approach 0%.

In order to simultaneously ensure a high detection probability, a low false alarm probability and low interference levels, transmit power levels for the AIs have to be chosen carefully. Since the base station BS hitherto has not been informed about the location of, i.e. the path loss to, a requesting user equipment UE, usually the maximum available power has been selected in order to ensure sufficient AI detection and false alarm performance.

In this respect the AICH is somewhat similar to the Common Pilot CHannel (CPICH) that determines the cell size covered by the base station BS. Some predictions estimate a transmit power of 2 to 4 W for the CPICH. This would mean between 1.6 to 12.8 W mean power to be spent for an AICH when a continuous traffic of 1 to 4 simultaneous AIs and AICH is assumed. This could result in an exhaustive usage of the available base station power resources and other resources as a result of the fact that the base station BS does not have adequate information about the transmission path to the user equipment UE requesting access to the base station BS.

To avoid the scenario illustrated above the user equipments UEs transmit information available to them about the state of the transmission path to the base station BS together with the preamble signature ("identification code") on the UL PRACH. A possible procedure of transmitting exemplary transmission path information to the base station BS will be described hereinafter.

The preamble power ramping depicted in FIG. 2 starts at an initial power level that is estimated by the user equipment UE from the DL path loss and the target signal-to-noise ratio at the base station BS in order to ensure a specific reception quality. The DL path loss may for example be estimated from the broadcast base station power level (e.g. on the CPICH) and the actually received power level. Instead of or in addition to the path loss the user equipment UE may determine other parameters characteristic of the state of a transmission path to the base station BS, for example by means of measurements.

Once the user equipment UE has determined transmission path information in the form of a path loss estimate, it can classify itself with respect to its membership to a specific "path loss class". To that end the complete set of sixteen preamble signatures is split into individual path loss classes. For example the signatures could be split into four groups of four signatures each, wherein each signature group indicates a specific path loss. According to such a scenario the user equipment UE may select a preamble signature in dependence on the determined transmission path information based on the following association between preamble signatures and path loss estimates:

| Path Loss | Path Loss Class | Available Preamble Signatures |
| --- | --- | --- |
| 0–10 dB | 1 | 1–4 |
| >10–20 dB | 2 | 5–8 |
| >20–30 dB | 3 | 9–12 |
| >30 dB | 4 | 13–16 |

Having estimated an actual path loss for the transmission path to the base station BS, the user equipment UE randomly selects a corresponding preamble signature out of the signature group corresponding to this path loss and modulates this signature onto the preamble signal. Consequently, the preamble signal not only carries the identification code of the user equipment UE, but simultaneously transmission path information in the form of a specific path loss class.

For example if the user equipment UE estimates a path loss of 22 dB, it determines from the above table that this path loss corresponds to path loss class 3. It then selects randomly one of the signatures 9 to 12 corresponding to this path loss class 3 and modulates the selected signature onto the preamble.

By the above grouping of the sixteen preamble signatures and mapping onto path loss classes, signaling of path loss information from the user equipment UE to the base station BS can be performed. A serving base station BS which identifies a specific preamble signature can thus determine the corresponding path loss class (e.g. class 3) and may set the respective AI transmit power level appropriately (e.g. 10 dB below the CPICH transmit power level). This allows the base station BS to serve a user equipment UE which is close to the base station BS with a lower power level than a far distant user equipment UE. In particular, a serving base station BS may simultaneously transmit RA AIs with individually adjusted transmit power levels.

When the base station BS simultaneously transmits AIs on the DL AICH, the dedicated AI of a user equipment UE belonging to a low path loss class might be severely interfered by other AIs. Therefore it is advantageous to implement appropriate interference canceling procedures in the user equipment UE. Prior to discussing an exemplary interference canceling procedure in more detail, the units required in a user equipment UE and a base station BS to carry out the invention will be described with reference to FIGS. 7 and 8.

Figure 7:
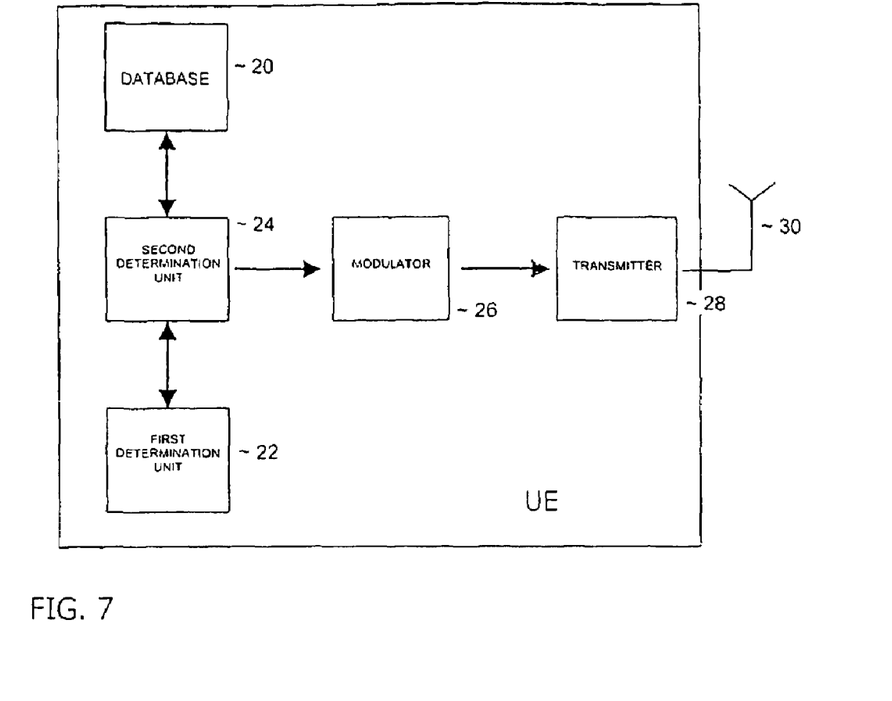
FIG. 7 schematically shows a network component in the form of a user equipment according to the invention.

In FIG. 7 one of the user equipments UEs of the wireless communications network 10 depicted in FIG. 1 is exemplarily illustrated. The user equipment UE comprises several units including a database 20, a first determination unit 22, a second determination unit 24, a modulator 26, a transmitter 28 and an antenna 30.

Each time a random access to the base station BS has to be initiated, the user equipment UE starts with deriving the path loss to the base station BS. To this end the first determination unit 22 of the user equipment UE estimates the path loss from the broadcast base station power level and the actually received power level. The estimated path loss is output to the second determination unit 24 which in response to receipt of the estimated path loss accesses the database 20 to determine a preamble signature corresponding to the estimated path loss.

The database 20 may for example include a look up table which indicates for individual path loss classes one or more available preamble signatures. In the case only one signature is valid for the particular estimated path loss, this signature is read by the second determination unit 24 out of the database 20 and is forwarded to the modulator 26. In the case the contents of the database 22 indicate that two or more preamble signatures are assigned to the particular path loss estimate, the second determination unit 24 randomly selects one of the valid signatures and forwards the selected signature to the modulator 26.

The modulator 26 modulates the preamble signature received from the selection unit 24 onto the preamble signal so that the preamble signal becomes indicative of the path loss estimate (i.e. path loss class). The modulated preamble signal is output to the transmitter 28 which transmits the modulated preamble signal via the antenna 30 to the base station BS.

Figure 8:
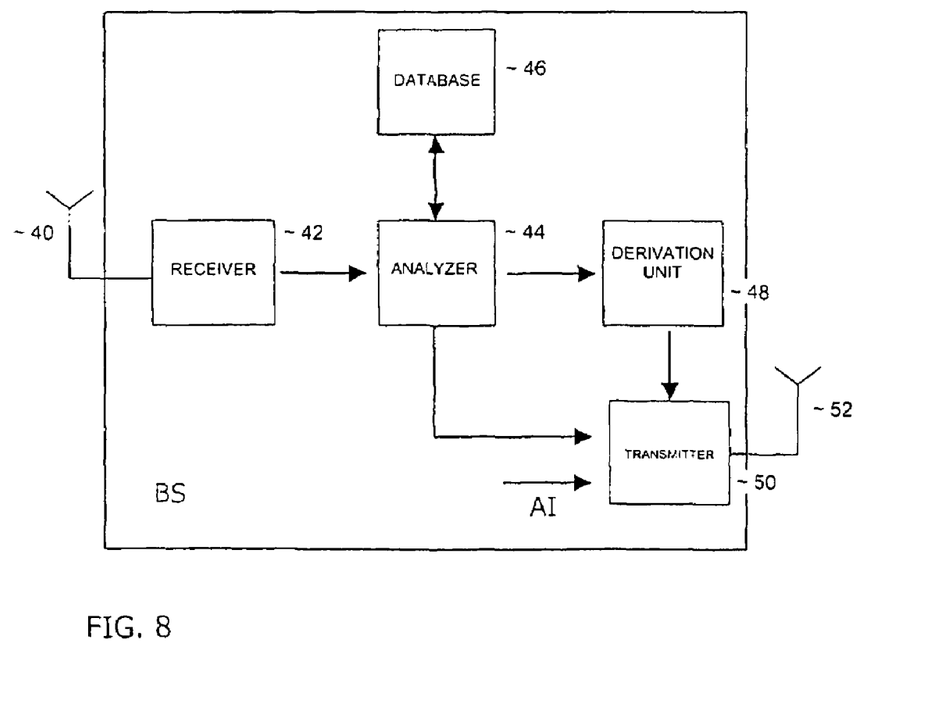
FIG. 8 schematically shows a network component in the form of a base station according to the invention.

As becomes apparent from FIG. 8, the base station BS comprises a receive antenna 40 for receiving preamble signals, a receiver 42, an analyzer 44, a database 46, a derivation unit 48, a transmitter 50, and a transmit antenna 52.

A preamble signal received by the receiver 42 via the antenna 40 is output to the analyzer 44 which analyzes the preamble signature with respect to e.g. the path loss class associated with this preamble signature. To this end the analyzer 44 accesses the database 46 which includes a table associating preamble signatures and path loss classes. The path loss class determined by the analyzer 44 is output to the derivation unit 48 which derives from e.g. an internal look up table a transmit power level for the AI to be transmitted on the DL AICH.

This transmit power level is output to the transmitter 50 which additionally receives information from the analyzer 44 about the specific preamble signature the transmit power level was derived for and AI access control Information (+1/0/−1). The transmitter generates an AI signal including the AI access control information and the respective AI signature corresponding to the preamble signature. The transmitter 50 then broadcasts the AI on the DL AICH at the transmit power level which was individually derived for a specific user equipment UE by the derivation unit 48.

In principle, the transmitter 50 may simultaneously transmit a plurality of AIs for a plurality of user equipments UEs at different transmit power levels depending on the individual path loss classes indicated by the preamble signatures of the individual user equipments UEs. This might lead to the situation that the received dedicated AI of a particular user equipment UE is severely interfered by other AIs, especially by such AIs transmitted at a higher transmit power level. To cope with such an interference, the user equipment UE might be provided with interference cancellation capabilities.

In the following, an exemplary interference cancellation (IC) procedure which might is be implemented in the user equipment UE of FIG. 7 will be described with reference to FIGS. 9 to 11. It should be noted that this IC technique is not limited to the particular user equipment UE depicted in FIG. 7 but can generally be employed in a wireless communications system in context with multi-user detection (MUD).

Figure 9:
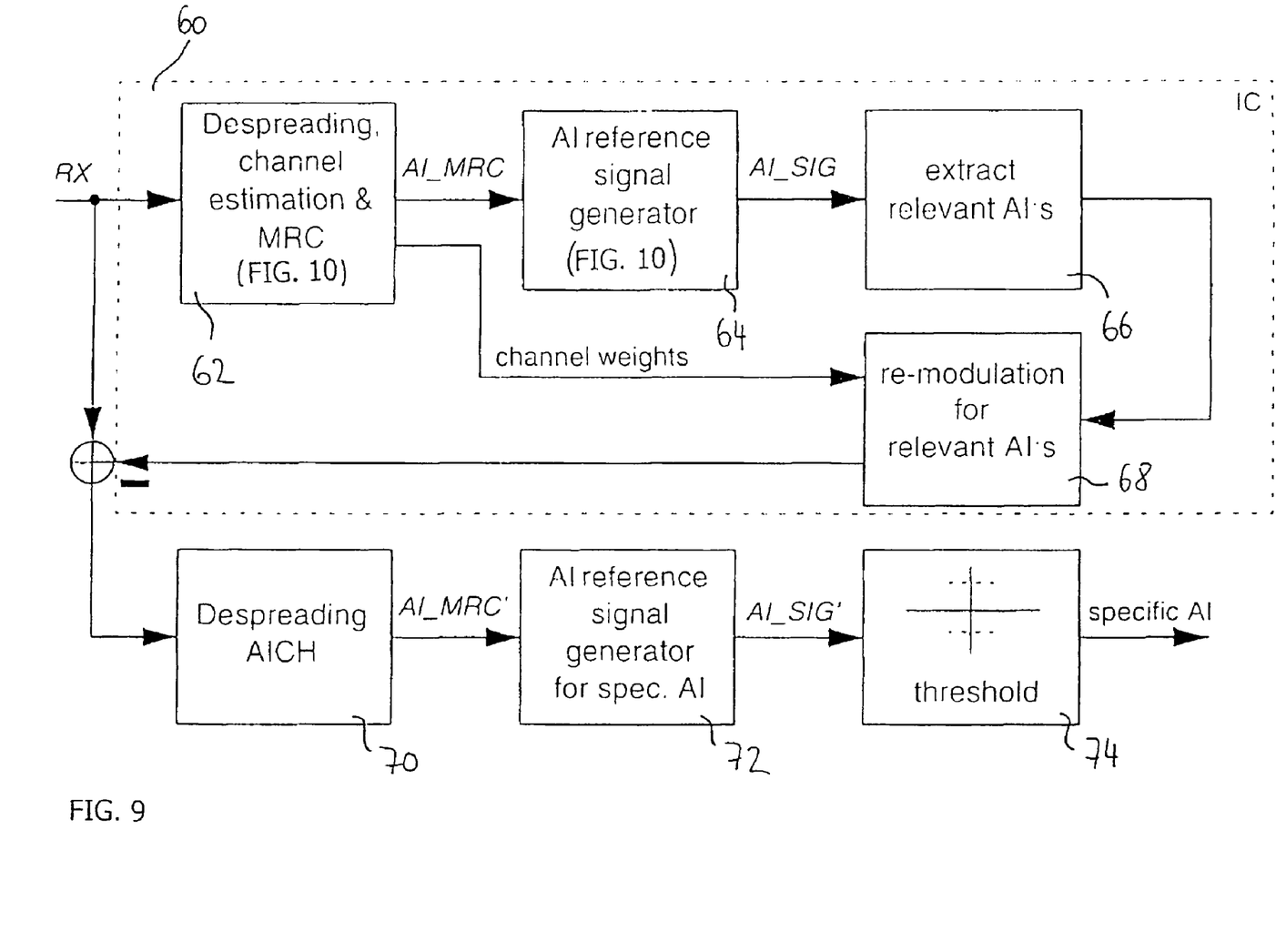
FIG. 9 schematically shows the units of a user equipment involved in an interference canceling procedure.

FIG. 9 schematically shows components of a receiver for implementing an MUD/IC scheme for the AICH. As becomes apparent from FIG. 9, an IC unit 60 of the user equipment UE receives an AI signal that initially is subjected to despreading, channel estimation processing and Maximum Ratio Combining (MRC) in an IC component 62. The IC component 62 will be described in more detail below with reference to FIG. 10.

A signal AI_MRC output by the IC unit 62 is input to the AI reference signal generator 64 to generate a reference signal AI_SIG relating to all AIs concurrently received on the DL AICH. The signal AI_SIG is input into an extracting component 66 of the IC unit 60 where all AIs that are weighted stronger (i.e. that are transmitted at a higher power level) than the own AI of the user equipment UE are detected. Equally or lower weighted AIs, i.e. AIs transmitted at the same or a lower power level than the own AI of the user equipment UE, need not be considered further due to their negligible contribution to the overall inference.

The stronger weighted AIs detected by the extracting component 66 are input to a re-modulator 68 together with the already available channel estimates output by the IC component 62. The re-modulator 68 generates a compensation signal relating to all AIs that are not associated with the own AI of the user equipment UE and that are transmitted at a higher power level. The compensation signal is then subtracted from the received AI signal resulting in an interference-reduced signal for detection of the AI modulated at a base station BS on the corresponding AI signature.

The received signal from which the compensation signal has been subtracted is despread in a despreader 70 to generate a despread signal AI_MRC'. This signal AI_MRC' is then input into AI reference signal generator 72 for the specific AI to generate the specific AI signal AI_SIG'. The AI_SIG' signal is then subjected to a threshold decision in the detector 74 to determine if the access control information AI for the particular user equipment UE equals −1, 0 or +1.

Now the IC component 62 and the AI reference signal generator 64 of the IC unit 60 of FIG. 9 will be described in more detail with reference to FIGS. 10 and 11.

Figure 10:
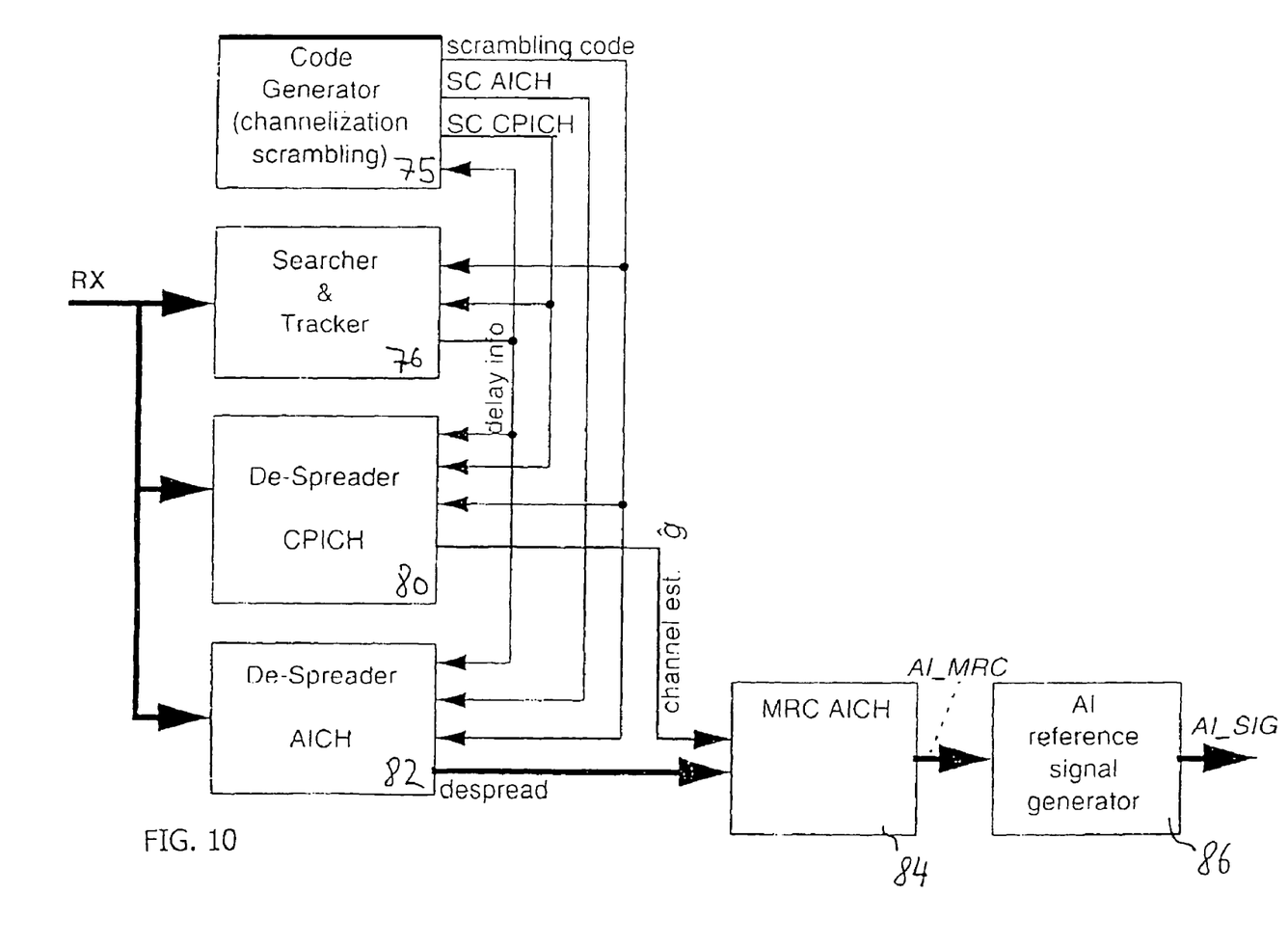
FIG. 10 schematically shows some of the units depicted in FIG. 9 in more detail.

FIG. 10 shows the structure of a CPICH/AICH-RAKE-based AI receiver approach. In addition to a code generator 75 and receiver components 76, 80 that are searching/tracking as well as despreading (and demodulating) the CPICH signal, an AI despreader 82 and an AI MRC unit 84 share the delay and channel estimate information generated by the components units 76, 80.

The channel estimates delivered from demodulation of the CPICH are assessed on an AI symbol basis. In order to remove the noise component of the estimated channel tap weights, a simple averaging of a number of channel estimates is applied:

$$\hat{g}_l[k] = \sum_{i=k-N_{aver}+1}^{k} \tilde{g}_l[i] / N_{aver}$$

where $\tilde{g}_l[k]$ is the complex channel tap weight directly calculated from demodulating the DPICH at symbol instant k. The number of averaged "raw" weights was adapted to the maximum Doppler shift. The used rule of thumb was:

$$N_{aver} = \text{round}\left(\frac{1}{10 \cdot 2 f_{Doppler} \cdot t_{symbol}}\right)$$

where $f_{Doppler}$ is the maximum Doppler shift and $t_{symbol}$ is the symbol duration (here $t_{symbol} \approx 0.0625$ ms). The Doppler shift adaptation can be omitted in the case there is no or only a small Doppler shift.

In the AI MRC unit 84 the following operation is performed on each demodulated AI symbol AI[k].

$$\text{AI\_MRC}[k] = \sum_{l=1}^{L} AI_l[k] \cdot \hat{g}_l[k]^*$$

where AI_MRC[k] is the symbol-based output, $AI_l[k]$ is the demodulated AI symbol for each propagation path (each used RAKE finger); L is the number of propagation paths and $\hat{g}_l[k]^*$ is the complex conjugate symbol-based channel estimate for propagation path l and symbol instant k.

Figure 11:
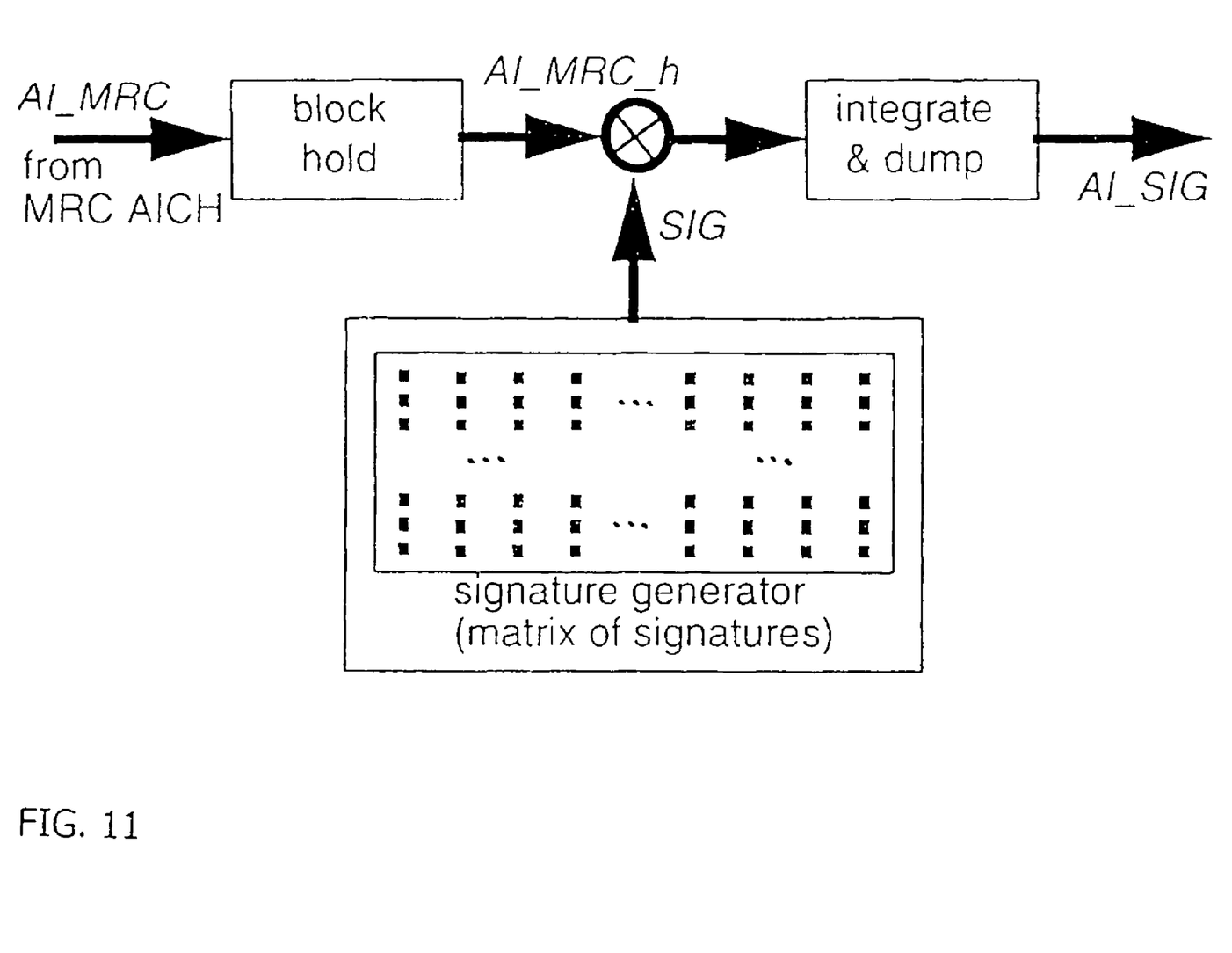
FIG. 11 schematically shows some of the units depicted in FIG. 10 in more detail.

FIG. 11 sketches the generation process of the AI reference signal (AI_SIG) from the AI MRC output signal AI_MRC within the AI reference signal generator 86 shown in FIG. 10. This output signal is blockwise (16 samples) held, resulting in AI_MRC_h, and multiplied with all 16 signatures from a reference signature element. This operation results in 16 complex signature reference values, one for each signature. This means that a positive AI sent signature will ideally result in a reference value of 1, a non-sent signature will result in a reference value 0 and a negative acknowledgement will result in −1.

The respective process can be expressed by the following matrix operation:

$$\overline{AI\_SIG} = \overline{AI\_MRC} \cdot \underline{SIG}$$

Here $\overline{\text{AI\_SIG}}$ means the row vector (block) of 16 signature reference values, $\overline{\text{AI\_MRC}}$ denotes the row vector (block) of 16 AI-MRC output samples and $\underline{\text{SIG}}$ represents the (16×16) matrix of all (complex) signatures.

Summarizing, the invention proposes to generate an access request signal carrying transmission path information. This information may be exploited by a receiving network component for a variety of different purposes. For example it allows a power allocation for AIs on the AICH and thus a capacity increase in a base station BS.

Furthermore, a reduced peak-to-average power ratio in a base station power amplifier may be realized.

Since the invention is compliant with current specifications for e.g. 3GPP, no major changes of the 3GPP RA procedure and specification are necessary to implement the invention. In particular, the utilization of the present invention can be left as an option to an operator of a specific base station.

While embodiments of the present invention have been shown and described, various modifications may be made without departing from the spirit and scope of the present invention, and all such modifications and equivalents are intended to be covered.

The invention claimed is:

1. A method of requesting access to a node of a wireless communications network, the method, comprising the steps of:
   a) determining information about a transmission path within the network;
   b) determining an identification code to differentially identify a requesting network component from other network components based on the determined transmission path information, wherein previously an association between identification codes and transmission path information has been established; and
   c) modulating, by the requesting network component, the determined identification code onto a signal to generate an access request signal from which transmission path information may be derived.

2. The method of claim 1, further comprising:
   d) analyzing an access control signal that is received in response to the access request signal and that includes access control information.

3. The method of claim 2, wherein the access control signal simultaneously includes access control information for a plurality of network components and wherein the access control information for each network component is associated in the access control signal with an individual identification code.

4. The method of claim 3, wherein the access control signal is subjected to an interference canceling step which includes subtracting from the access control signal a compensation signal relating to access control information that is not associated with the identification code determined in step b).

5. The method of claim 1, wherein the access request signal including the identification code determined in step b) is transmitted repeatedly using transmit power ramping.

6. The method of claim 1, wherein the identification code is selected out of a predefined set or range of identification codes.

7. A method of controlling access to a node (BS) of a wireless communications network, the method comprising the steps of
   a) receiving an access request signal onto which an identification code has been modulated by a requesting network component, the identification codes differentially identifying the requesting network component from other network components;
   b) analyzing the identification code to derive a transmit power level therefrom, wherein previously an association between identification codes and transmit power levels has been established;
   c) transmitting an access control signal including access control information at the transmit power level derived in step b).

8. The method of claim 7, wherein step b) comprises analyzing the identification code with respect to transmission path information associated therewith, wherein the identification codes are associated via transmission path information with transmit power levels and wherein the transmit power level corresponding to a specific identification code is derived from the transmission path information corresponding to the specific identification code.

9. The method of claim 7, wherein the access control signal includes the identification code analyzed in step b).

10. The method of claim 7, wherein the access control signal simultaneously includes access control information for a plurality of network components which are requesting access to the node and wherein the transmit power level for the access control signal is derived and adjusted individually for each network component which requests access.

11. A network component configured to request access to a node of a wireless communications network, said network component comprising:
    a first determination unit for determining information about a transmission path within the network;
    a database including data associating identification codes and transmission path information, wherein said identification codes differentially identify a requesting network component from other network components; and
    a second determination unit for determining, in dependence on the determined transmission path information, an identification code to be included in an access request signal sent from the requesting network component from which transmission path information may be derived.

12. The network component of claim 11, further comprising:
    a modulator for modulating the selected identification code onto a signal to generate the access request signal; and,
    a transmitter for transmitting the access request signal.

13. A network component configured to control access to a node of a wireless communications system, the network component comprising:
    a database including data associating identification codes from which transmit power information may be derived, wherein said identification codes differentially identify a requesting network component from other network components;
    an analyzer for analyzing the identification code included within a received access request signal sent from the requesting network component, with respect to the transmit power information associated with the identification code; and,
    a derivation unit for deriving from the transmit power information obtained by the analyzer a transmit power level for an access control signal.

14. The network component of claim 13, further comprising:
a receiver for receiving the access request signal onto which the identification code has been modulated; and,
a transmitter for transmitting the access control signal at the transmit power level derived by the derivation unit, wherein the access control signal includes access control information and, preferably, the identification code which has been modulated onto the received access request signal.

* * * * *